United States Patent
Birinov et al.

(10) Patent No.: US 8,284,836 B2
(45) Date of Patent: Oct. 9, 2012

(54) MOTION COMPENSATION METHOD AND APPARATUS TO PERFORM PARALLEL PROCESSING ON MACROBLOCKS IN A VIDEO DECODING SYSTEM

(75) Inventors: Dmitri Birinov, Yongin-si (KR); Joon-ho Song, Hwaseong-si (KR); Doo-hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 12/081,863

(22) Filed: Apr. 22, 2008

(65) Prior Publication Data
US 2009/0175345 A1    Jul. 9, 2009

(30) Foreign Application Priority Data
Jan. 8, 2008    (KR) .................. 10-2008-0002339

(51) Int. Cl.
*H04B 1/66*    (2006.01)
*H04N 7/12*    (2006.01)
*H04N 11/02*    (2006.01)
*H04N 11/04*    (2006.01)

(52) U.S. Cl. ......... 375/240.12; 375/240.16; 375/240.24; 348/719; 348/720; 348/721

(58) Field of Classification Search ............... None
See application file for complete search history.

(56) References Cited

U.S. PATENT DOCUMENTS

| | | | | |
|---|---|---|---|---|
| 5,781,788 | A * | 7/1998 | Woo et al. | 712/1 |
| 5,963,222 | A * | 10/1999 | Cheney et al. | 345/572 |
| 6,850,568 | B1 * | 2/2005 | Williams et al. | 375/240.16 |
| 6,999,087 | B2 | 2/2006 | Lavelle et al. | |
| 2003/0185298 | A1 * | 10/2003 | Alvarez et al. | 375/240.03 |
| 2003/0185306 | A1 * | 10/2003 | MacInnis et al. | 375/240.25 |
| 2005/0119870 | A1 | 6/2005 | Hosogi et al. | |
| 2006/0072674 | A1 * | 4/2006 | Saha et al. | 375/240.25 |
| 2006/0143615 | A1 | 6/2006 | Kondo et al. | |
| 2007/0206675 | A1 * | 9/2007 | Tanaka | 375/240.12 |
| 2008/0031329 | A1 * | 2/2008 | Iwata et al. | 375/240.12 |
| 2008/0031333 | A1 * | 2/2008 | Li et al. | 375/240.16 |
| 2008/0031357 | A1 * | 2/2008 | Kimura | 375/240.25 |

FOREIGN PATENT DOCUMENTS

| | | |
|---|---|---|
| KR | 10-1999-0023092 | 3/1999 |
| KR | 10-2001-0002990 | 1/2001 |
| KR | 10-2006-0027808 | 3/2006 |

* cited by examiner

*Primary Examiner* — Ayaz Sheikh
*Assistant Examiner* — Peter Chau
(74) *Attorney, Agent, or Firm* — Staas & Halsey LLP

(57) ABSTRACT

Provided is a motion compensation method and apparatus. The motion compensation method includes performing register setting for motion compensation of an $m^{th}$ macroblock of a current image, performing prediction for the $m^{th}$ macroblock simultaneously with performing register setting for motion compensation of an $(m+1)^{th}$ macroblock, and performing reconstruction for the $m^{th}$ macroblock based on a prediction result simultaneously with performing prediction for the $(m+1)^{th}$ macroblock. By parallely processing motion compensation on macroblocks, the amount of time required for motion compensation of the macroblocks can be reduced.

13 Claims, 5 Drawing Sheets

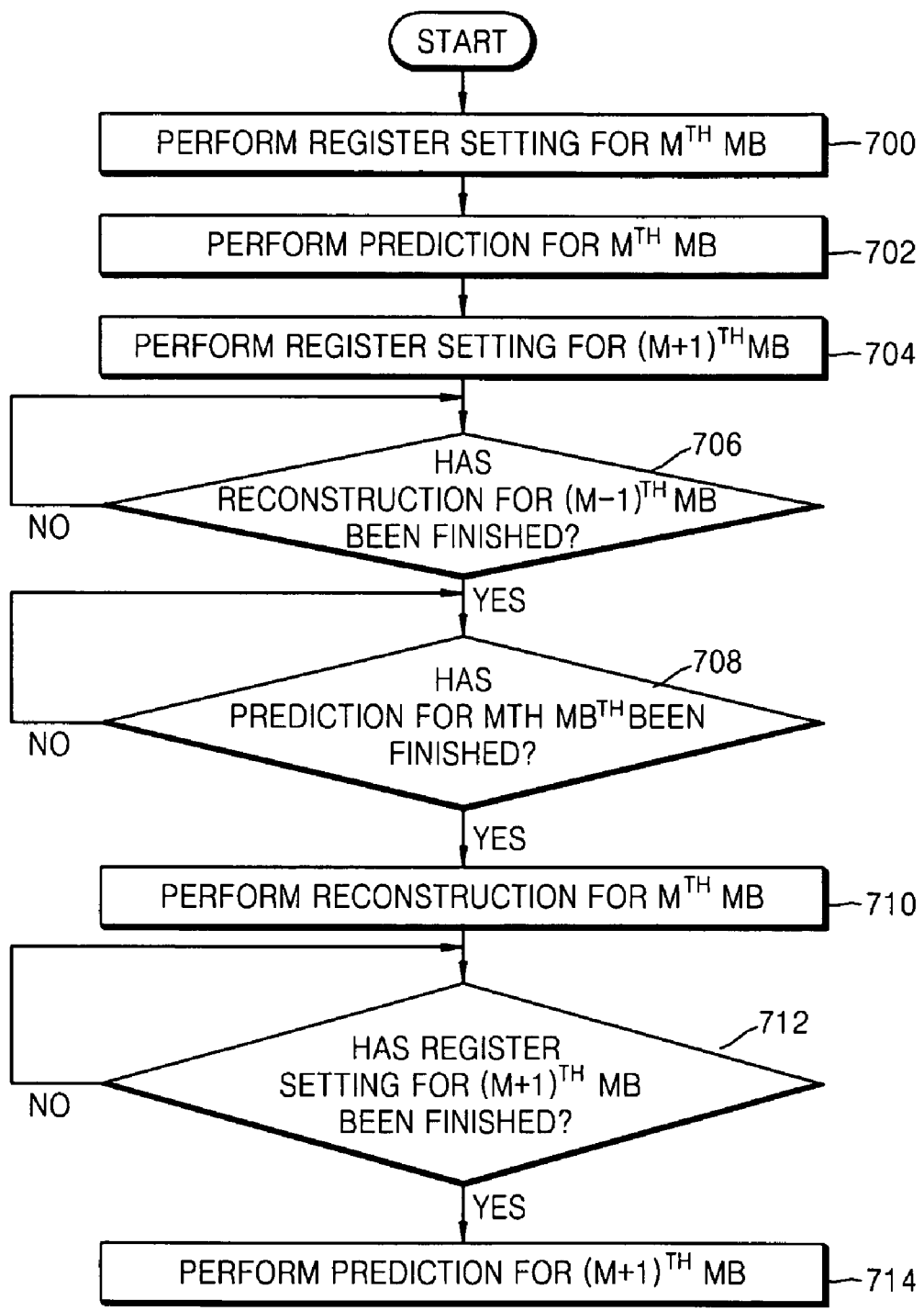

MOTION COMPENSATION METHOD AND APPARATUS TO PERFORM PARALLEL PROCESSING ON MACROBLOCKS IN A VIDEO DECODING SYSTEM

CROSS-REFERENCE TO RELATED PATENT APPLICATION

This application claims the benefit of Korean Patent Application No. 10-2008-0002339, filed on Jan. 8, 2008, in the Korean Intellectual Property Office, the disclosure of which is incorporated herein in its entirety by reference.

BACKGROUND OF THE INVENTION

1. Field of the Invention

The present invention generally relates to video decoding, and more particularly, to a motion compensation method and apparatus which can be applied to a video decoding system.

2. Description of the Related Art

Video decoding includes several processes such as entropy decoding, inverse transformation, inverse quantization, and motion compensation. Among these processes, motion compensation requires longer processing time than the other processes. As such, motion compensation involves extracting, from a reference image, common data between a current image and the reference image from the reference image by referring to motion vectors indicating displacement between blocks of the current image and counterpart blocks of the reference image and adding the difference data between the current image and the reference image, which is referred to as residue data, to the extracted common data, which is referred to as motion compensation data, and thereby reconstructing the current image. In motion compensation, a large amount of image data has to be processed and thus the amount of memory access and the amount of computation are also large. Since the amount of processing in motion compensation is proportional to the size of an image, image processing may not be completed within a desired period of time in the worst scenario where the size of the image is significantly large. As a result, smooth video reproduction may not be possible at all.

Most video coder/decoder (codec) engineers prefer implementing a video codec with software to implementing the video codec with hardware because the implementation of the video codec with software hereinafter referred to as a software implementation scheme, can reduce the time and cost required for development, facilitate the reuse of the implemented video codec, and easily correct an error occurring in the implemented video codec due to its high flexibility. However, the core of the video codec is real-time processing. In spite of such advantages, the software implementation scheme may be useless if the implemented video codec cannot process video encoding/decoding in real time. On the other hand, the implementation of the video codec with hardware, hereinafter referred to as a hardware implementation scheme, requires much time and cost for development and the modification of the implemented video codec may be accompanied with the risk of having to change the entire structure of the implemented video codec due to its low flexibility. Above all things, the hardware implementation scheme allows optimization for a target and thus sharply increases the speed of video encoding/decoding as compared to the software implementation scheme.

Due to the reciprocal advantages and disadvantages of the software implementation scheme and the hardware implementation scheme, video codec engineers usually combine these two schemes. In other words, a module constituting a video codec is implemented separately as portions to be processed with software and portions to be processed with hardware according to the characteristics of the portions. In this case, a portion that must be implemented with hardware is motion compensation. Also, processing with software is not suitable for motion compensation since motion compensation requires even more memory access as well as much data computation than other portions.

Image reconstruction is difficult to be processed in real time due to a large amount of computation and an excessively large amount of memory access. To solve this problem, various methods have been used. As one of these methods, processes requiring more computation or memory access than other processes may be implemented with hardware in order to maximize the efficiency of a video codec. A process of generating a prediction frame as a function of a video codec, i.e., a prediction process, occupies a large portion of a video decoding process and requires much memory access. Thus, such prediction process is usually implemented with hardware in order to enhance the performance of the video codec. In a video codec system composed of several modules such as a central processing unit (CPU), a hardware accelerator, and the like, a method for data transmission between modules, the order of the data transmission, and a point of time for the data transmission are key factors in the performance of the video codec system.

In the performance of a video codec system having a hardware accelerator mounted thereon, the performance of the hardware accelerator is a crucial part. In a motion compensation hardware accelerator (MC HWA), all operations of the prediction hardware accelerator are sequentially performed. In other words, the amount of processing time for each macroblock is large. Moreover, a CPU can transmit control information for a new macroblock only after a prediction process for a previous macroblock is finished. Thus, the CPU has to wait until the prediction process for the previous macroblock is finished, and this is a disadvantage in terms of the time required for motion compensation.

SUMMARY OF THE INVENTION

The present invention provides a motion compensation method and apparatus, which can reduce the amount of time required for motion compensation performed on macroblocks by parallely performing register setting, prediction, and reconstruction on the macroblocks unlike in conventional motion compensation.

According to an aspect of the present invention, there is provided a motion compensation method including performing register setting for motion compensation of an $m^{th}$ macroblock of a current image, performing prediction for the $m^{th}$ macroblock simultaneously with performing register setting for motion compensation of an $(m+1)^{th}$ macroblock, and performing reconstruction for the $m^{th}$ macroblock based on a prediction result simultaneously with performing prediction for the $(m+1)^{th}$ macroblock.

According to another aspect of the present invention, there is provided a motion compensation apparatus including a motion compensation engine performing prediction by generating motion compensation data by using motion compensation parameters for macroblocks of a current image and macroblocks of a reference image, which correspond to the macroblocks of the current image, a first memory storing motion compensation data for an $m^{th}$ macroblock of the current image, which is output from the motion compensation engine, a second memory storing motion compensation data for an $(m+1)^{th}$ macroblock of the current image, which is output from the motion compensation engine, a third memory storing residue data indicating a difference between a macroblock of the current image and a macroblock of the reference image, an adder performing reconstruction by adding residue data for the $m^{th}$ macroblock to the motion compensation data for the $m^{th}$ macroblock, where the residue data for the $m^{th}$ macroblock and the motion compensation data for the $m^{th}$ macroblock are respectively stored in the third memory and the first memory, or adding residue data for the $(m+1)^{th}$ macroblock to motion compensation data for the $(m+1)^{th}$ macroblock, where the residue data for the $(m+1)^{th}$ macroblock and the motion compensation data for the $(m+1)^{th}$ macroblock are respectively stored in the third memory and the second memory, a slave interface inputting and outputting the motion compensation parameters for the macroblocks of the current image and the macroblocks of the reference image, which correspond to the macroblocks of the current image, and a master slave outputting the motion compensation parameters input from the slave interface to the motion compensation engine and outputting reconstructed macroblocks input from the adder.

According to another aspect of the present invention, there is provided a computer-readable recording medium having recorded thereon a program for executing the motion compensation method.

BRIEF DESCRIPTION OF THE DRAWINGS

The above and other features and advantages of the present invention will become more apparent by describing in detail embodiments thereof with reference to the attached drawings in which:

FIG. 7 is a flowchart illustrating a motion compensation method according to another embodiment of the present invention.

DETAILED DESCRIPTION OF THE INVENTION

Figure 1:
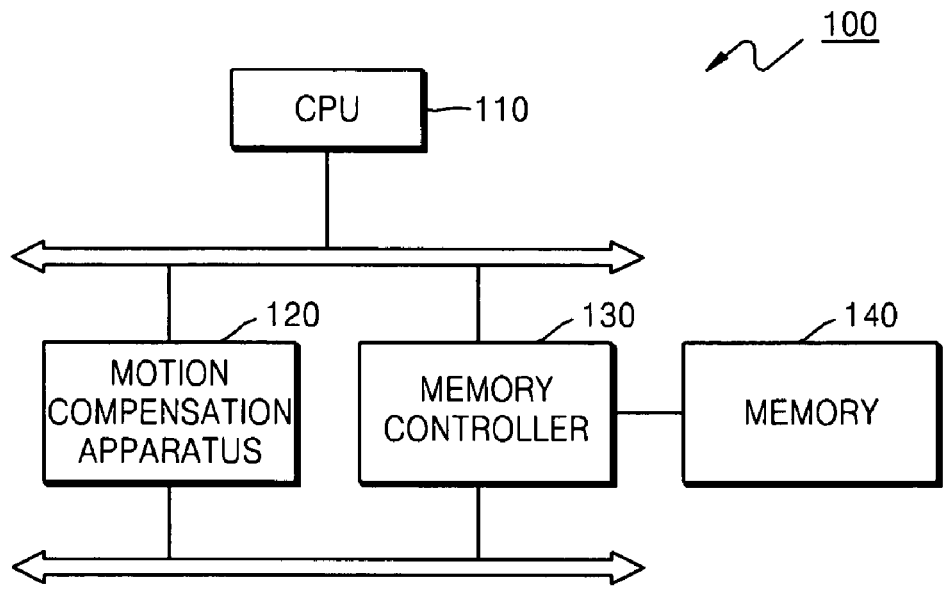
FIG. 1 is a schematic block diagram of a video decoding system including a general motion prediction apparatus.

Hereinafter, embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

FIG. 1 is a schematic block diagram of a video decoding system 100 including a general motion prediction apparatus 120.

Referring to FIG. 1, the video decoding system 100 includes a central processing unit (CPU) 110, the motion compensation apparatus 120, a memory controller 130, and a memory 140.

The CPU 110, which is for overall system control, the memory controller 130, the motion compensation apparatus 120, which performs a prediction process, are connected through a system bus. A master interface of the motion compensation apparatus 120 is connected to a second port of the memory controller 130 through an independent bus.

The CPU 110 provides decoding information, motion vector information, and reference frame information for a current image that is to be decoded to the motion compensation apparatus 120 through the system bus. The motion compensation apparatus 120 decodes the current image by performing motion compensation, and outputs the decoded current image to the memory controller 130 through the master interface of the motion compensation apparatus 120, where motion compensation means a process of extracting, from a reference image, common data between a current image and a reference image from the reference image by referring to motion vectors indicating displacement between blocks of the current image and counterpart blocks of the reference image and adding residue data between the current image and the reference image to motion compensation data, thereby reconstructing the current image. Thus, the motion compensation apparatus 120 performs the prediction process requiring much computation and much memory access in the video reconstruction processing, thereby improving the overall efficiency of the video decoding system 100.

Figure 2:
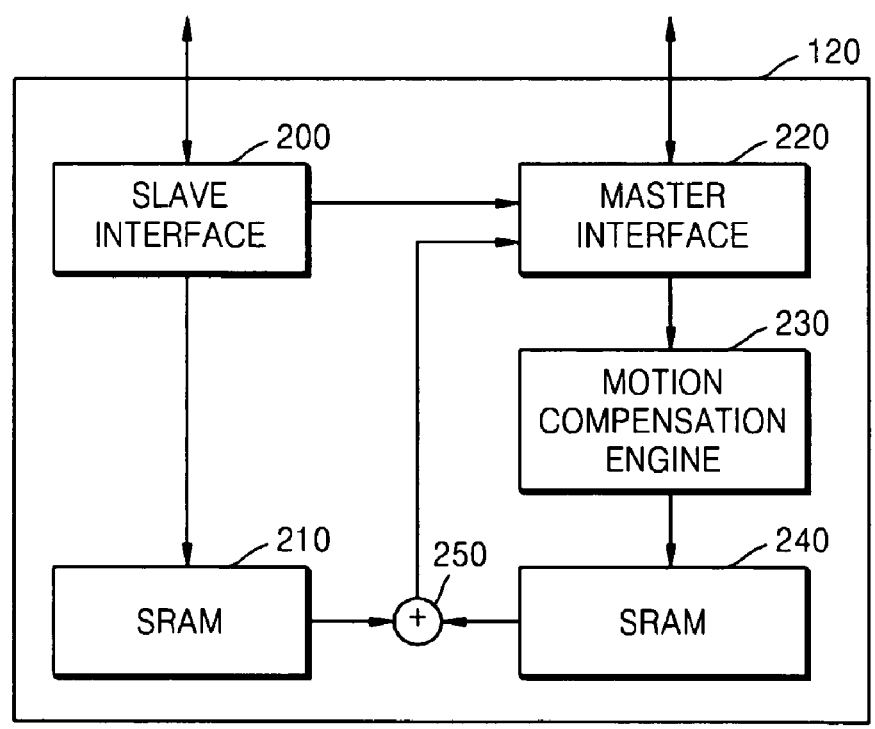
FIG. 2 is a schematic block diagram of the motion compensation apparatus illustrated in FIG. 1.

FIG. 2 is a schematic block diagram of the motion compensation apparatus 120 illustrated in FIG. 1.

Referring to FIG. 2, the motion compensation apparatus 120 includes a slave interface 200, a synchronous random access memory (SRAM) 210, a master interface 220, a motion compensation engine 230, an SRAM 240, and an adder 250.

The slave interface 200 fetches residue data transmitted from the CPU 110 through the system bus of the video decoding system 100, and outputs the fetched residue data to the SRAM 210. The slave interface 200 also fetches motion compensation parameters, required for motion compensation, from the CPU 110 through the system bus, and outputs the fetched motion compensation parameters to the master interface 220.

The master interface 220 analyzes the motion compensation parameters input from the slave interface 200, sorts the motion compensation parameters based on an analysis result in order to output a sorting result to the motion compensation engine 230, and controls an operation of the motion compensation engine 230.

The SRAM 210 stores the residue data input from the slave interface 200, and the SRAM 240 stores motion compensation data generated by the motion compensation engine 230. The adder 250 reconstructs the current image by adding the residue data stored in the SRAM 210 to the motion compensation data stored in the SRAM 240, and outputs the reconstructed current image to the master interface 220.

The motion compensation engine 230 performs motion compensation on data input from the master interface 220, e.g., data in 8-bit units. More specifically, the motion compensation engine 230 calculates a value of a pixel between pixels of a reference image from values of the pixels of the reference image by using at least one of a plurality of methods of interpolating pixels of a current image, which correspond to a current image, e.g., using a vertical linear filter, a horizontal linear filter, and cubic filters, according to the motion compensation filters input from the master interface 220, e.g., codec information indicating one of a plurality of codecs, color information indicating one of a plurality of color components, and filter information indicating one of a plurality of filters.

In video compression codecs such as moving picture experts group (MPEG)-4, H.264/advanced video coding (AVC), VC1, and the like, a motion vector indicates not only pixels within a reference image, i.e., integer pixels, but also a half pixel located ½ between the integer pixels or a quarter pixels located ¼ between the integer pixels, so as to reconstruct an image in high resolution. Since the half pixel and the quarter pixel do not exist in the reference image by themselves, their values have to be generated using pixel interpolation, and filtering is performed on the half pixel and the quarter pixel using the above-described filters.

A general operation of the motion compensation apparatus 120 will be described with reference to FIG. 3.

Figure 3:
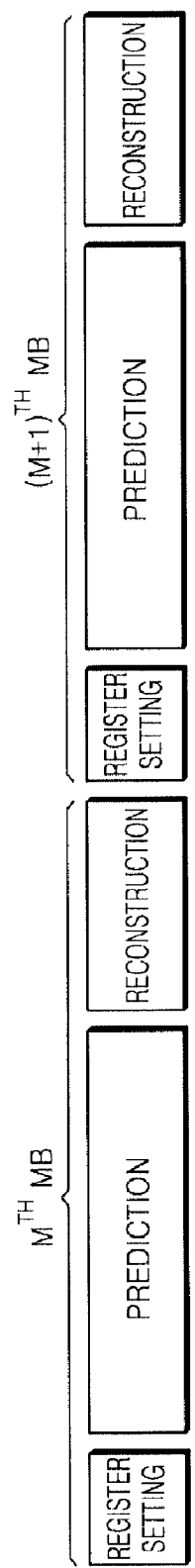
FIG. 3 is a view for explaining a video decoding process using general motion prediction.

As illustrated in FIG. 3, a general motion prediction process includes a register setting stage, a prediction stage, and a reconstruction stage. Each of these stages is performed in units of a macroblock of a current image. In other words, after register setting, prediction, and reconstruction for a first macroblock are completed, motion compensation, i.e., register setting, prediction, and reconstruction are performed on a second macroblock.

The register setting stage involves setting register chains inside a particular filter of the motion compensation engine 120. In other words, registers inside the filter are programmed and residue data is transmitted in the register setting stage.

The prediction stage involves generating prediction data using a currently reconstructed image. In other words, motion compensation data is generated in the prediction stage using a macroblock of a reference image corresponding to a current macroblock of the current image and motion compensation parameters.

The reconstruction stage involves generating a reconstruction macroblock by adding the residue data to the prediction data. In other words, in the reconstruction stage, difference data between the current macroblock of the current image and the counterpart macroblock of the reference image is added to the motion compensation data resulting from prediction performed on the current macroblock of the current image.

The register setting stage, the prediction stage, and the reconstruction stage are sequentially performed and repeated in units of a macroblock, and thus, in this case, the processing time for each macroblock increases. Moreover, since the CPU 110 can start motion compensation for a new macroblock only after completion of motion compensation for a previous macroblock, the CPU 110 has to wait until motion compensation for the previous macroblock is finished.

Figure 4:
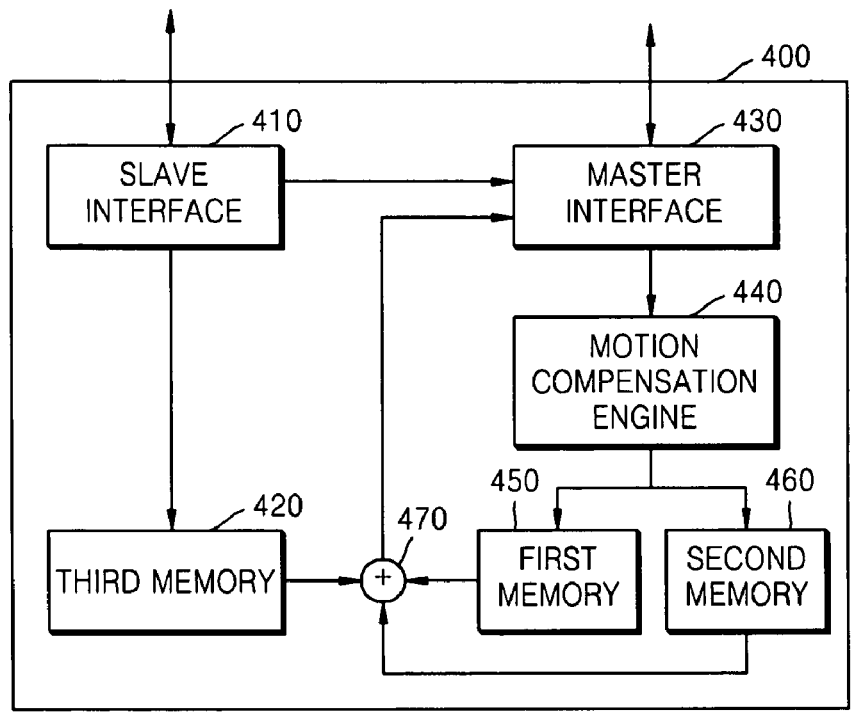
FIG. 4 is a schematic block diagram of a motion compensation apparatus according to another embodiment of the present invention.

FIG. 4 is a schematic block diagram of a motion compensation apparatus 400 according to another embodiment of the present invention.

Referring to FIG. 4, the motion compensation apparatus 400 includes a slave interface 410, a third memory 420, a master interface 430, a motion compensation engine 440, a first memory 450, a second memory 460, and an adder 470.

Unlike in the motion compensation apparatus 120 illustrated in FIG. 2, a memory for storing motion compensation data output from a motion compensation engine 440 is divided into a first memory 450 and a second memory 460.

Preferably, the first memory 450, the second memory 460, and the third memory 420 can be implemented with SRAMs.

The motion compensation apparatus 400 performs a prediction stage of performing motion compensation on an arbitrary macroblock, e.g., an $m^{th}$ macroblock, in order to generate motion compensation data, and outputting the generated motion compensation data to the first memory 450 and at the same time, performs a register setting stage for an $(m+1)^{th}$ macroblock. The motion compensation apparatus 400 also determines if a reconstruction stage for an $(m-1)^{th}$ macroblock has been finished. In the reconstruction stage, the adder 470 adds residue data stored in the third memory 420 to the motion compensation data stored in the second memory 460.

If the reconstruction stage for the $(m-1)^{th}$ macroblock has been finished, the motion compensation apparatus 400 performs a reconstruction stage of adding residue data for the $m^{th}$ macroblock to the motion compensation data for the $m^{th}$ macroblock, after completion of the prediction stage for the $m^{th}$ macroblock, where the residue data for the $m^{th}$ macroblock and the motion compensation data for the $m^{th}$ macroblock are respectively stored in the third memory 420 and the first memory 450.

Thus, it is possible to overcome disadvantages occurring when a particular frame of a current frame is divided into macroblocks of a particular size, e.g., 16×16 pixels, and motion compensation is performed sequentially on each of the macroblocks. In other words, by parallely processing the 3 stages of the motion compensation, i.e., the register stage, the prediction stage, and the reconstruction stage, the time required for motion compensation for each macroblock can be minimized.

Figure 5:
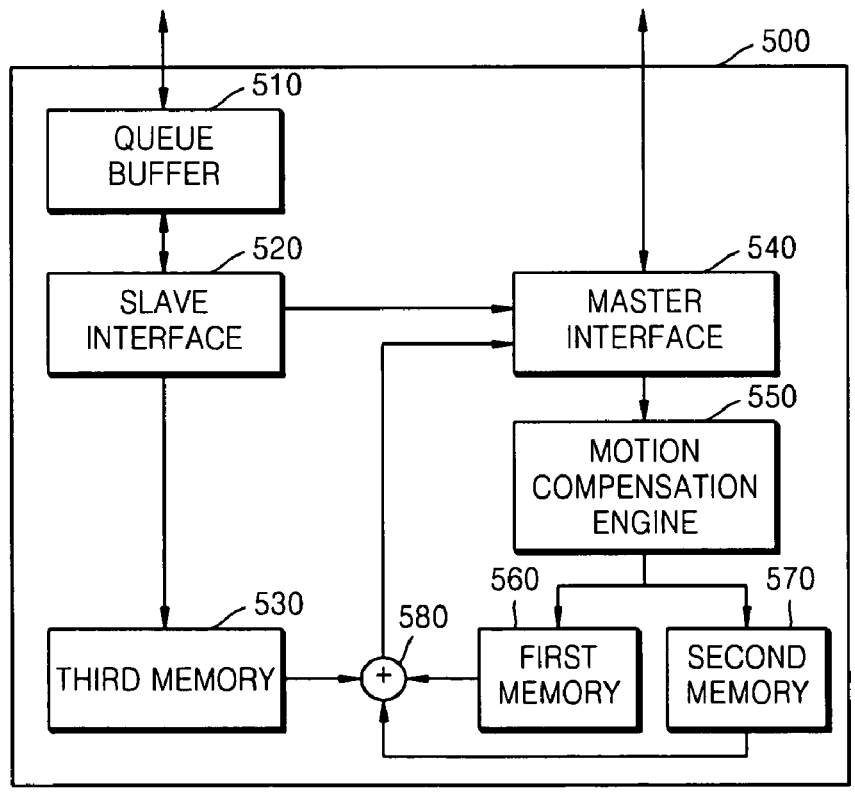
FIG. 5 is a schematic block diagram of a motion compensation apparatus according to another embodiment of the present invention.

FIG. 5 is a schematic block diagram of a motion compensation apparatus 500 according to another embodiment of the present invention.

Referring to FIG. 5, the motion compensation apparatus 500 further includes a queue buffer 510 in addition to the components of the motion compensation apparatus 400.

The queue buffer 510 stores motion compensation parameters to be input to a master interface 540 and residue data to be stored in a third memory 530.

Once a CPU (not shown) transmits the motion compensation parameters and the residue data to a slave interface 520 through a system bus, the queue buffer 510 temporarily stores the motion compensation parameters and the residue data. After the motion compensation apparatus 500 reconstructs an image by completing motion compensation for a current macroblock, the motion compensation apparatus 500 reads information, about a next macroblock, from the queue buffer 510 for motion compensation.

Figure 6:
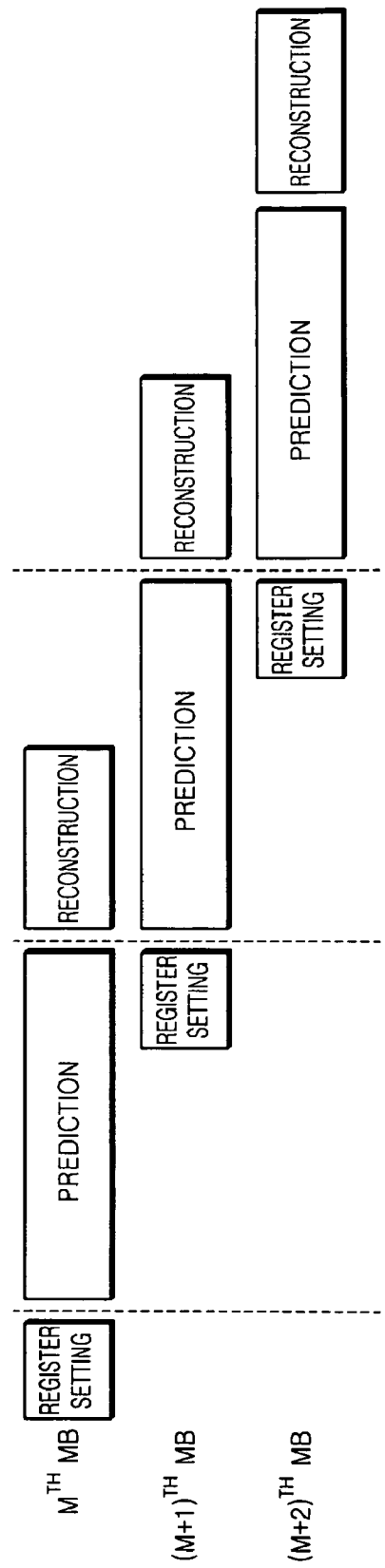
FIG. 6 is a view for explaining a motion compensation method according to an embodiment of the present invention.

FIG. 6 is a view for explaining a motion compensation method according to another embodiment of the present invention.

Hereinafter, the motion compensation method in which several processes are performed on macroblocks in parallel will be described with reference to FIG. 6.

For an $m^{th}$ macroblock, register setting and then prediction are performed, and motion compensation data resulting from the prediction is stored in the first memory 450. At the same time, register setting is performed for an $(m+1)^{th}$ macroblock.

For the $m^{th}$ macroblock, the motion compensation data stored in the first memory 450 is added to residue data stored in the third memory 420 for reconstruction. At the same time, if the register setting for the $(m+1)^{th}$ macroblock has been finished, prediction for the $(m+1)^{th}$ macroblock is performed and motion compensation data resulting from the prediction is stored in the second memory 460. At the same time, register setting for an $(m+2)^{th}$ macroblock is performed.

Thus, register setting, prediction, and reconstruction for the $m^{th}$ macroblock, the $(m+1)^{th}$ macroblock, and the $(m+2)^{th}$ macroblock overlap with one another, thereby reducing the amount of time required for motion compensation for each macroblock and reducing the amount of time required for entire image reconstruction.

FIG. 7 is a flowchart illustrating a motion compensation method according to another embodiment of the present invention.

Referring to FIG. 7, in operation 700, register setting for the $m^{th}$ macroblock is performed. In operation 702, prediction for the $m^{th}$ macroblock is performed. Motion compensation data resulting from the prediction is stored in the first memory 450 illustrated in FIG. 4. Simultaneously with operation 702, in operation 704, register setting for the $(m+1)^{th}$ macroblock is performed. In operation 706, it is determined if reconstruction for an $(m-1)^{th}$ macroblock has been finished. Motion compensation data for reconstruction of the $(m-1)^{th}$ macroblock is stored in the second memory 460 and residue data is stored in the third memory 420.

If it is determined in operation 706 that the reconstruction for the $(m-1)^{th}$ macroblock has been finished, it is determined if the prediction for the $m^{th}$ macroblock in operation 702 has been finished. If it is determined in operation 708 that the prediction for the $m^{th}$ macroblock has been finished, reconstruction for the $m^{th}$ macroblock is performed in operation 710. Here, the reconstruction for the $m^{th}$ macroblock is performed by adding the residue data stored in the third memory 420 to the motion compensation data stored in the first memory 450.

In operation 712, it is determined if the register setting for the $(m+1)^{th}$ macroblock in operation 704 has been finished. If it is determined in operation 712 that the register setting for the $(m+1)^{th}$ macroblock has been finished, prediction for the $(m+1)^{th}$ macroblock is performed in operation 714.

Operations 700 through 714 are repeated for all macroblocks of an image, thereby decoding the image.

The present invention can be embodied as a computer-readable code on a computer-readable recording medium. The computer-readable recording medium is any data storage device that can store data which can be thereafter read by a computer system.

Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion. Also, functional programs, code, and code segments for implementing the intra-prediction encoding/decoding method can be easily construed by programmers skilled in the art.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. A motion compensation method performed by a motion compensation apparatus in a decoding process, the method comprising:
    (a) performing register setting, by a motion compensation engine of the motion compensation apparatus, for motion compensation of an $m^{th}$ macroblock of a current image;
    (b) performing prediction, by the motion compensation engine, for the $m^{th}$ macroblock simultaneously with performing register setting, by the motion compensation engine, for motion compensation of an $(m+1)^{th}$ macroblock; and
    (c) performing reconstruction, by an adder of the motion compensation apparatus, for the $m^{th}$ macroblock based on a prediction result simultaneously with performing prediction for the $(m+1)^{th}$ macroblock and performing register setting for an $(m+2)^{th}$ macroblock simultaneously, by the motion compensation engine.

2. The motion compensation method of claim 1, wherein motion compensation data obtained by the prediction for the $m^{th}$ macroblock and motion compensation data obtained by the prediction for the $(m+1)^{th}$ macroblock are stored in different memories.

3. The motion compensation method of claim 1, wherein (c) comprises:
    determining if register setting for the $(m+1)^{th}$ macroblock has been finished; and
    performing the prediction for the $(m+1)^{th}$ macroblock if the register setting for the $(m+1)^{th}$ macroblock has been finished.

4. The motion compensation method of claim 1, further comprising, after (b):
    determining if reconstruction for an $(m-1)^{th}$ macroblock of the current image has been finished; and
    determining if the prediction for the $m^{th}$ macroblock has been finished if the reconstruction for the $(m-1)^{th}$ macroblock has been finished.

5. The motion compensation method of claim 1, wherein (c) comprises performing the reconstruction for the $m^{th}$ macroblock if the prediction for the $m^{th}$ macroblock has been finished.

6. The motion compensation method of claim 1, wherein the prediction is performed by generating motion compensation data by using an $m^{th}$ macroblock of a reference image, which corresponds to the $m^{th}$ macroblock of the current image, and motion compensation parameters for the $m^{th}$ macroblock.

7. The motion compensation method of claim 1, wherein the reconstruction is performed by adding residue data between the $m^{th}$ macroblock of the current image and an $m^{th}$ macroblock of a reference image, which corresponds to the $m^{th}$ macroblock of the current image, to motion compensation data obtained by the prediction for the $m^{th}$ macroblock.

8. A non-transitory computer-readable recording medium having recorded thereon a program for executing the method of claim 1.

9. A motion compensation apparatus comprising:
    a motion compensation engine to, perform prediction by generating motion compensation data by using motion compensation parameters for macroblocks of a current image and macroblocks of a reference image, which correspond to the macroblocks of the current image;
    a first memory to store motion compensation data for an $m^{th}$ macroblock of the current image, which is output from the motion compensation engine;
    a second memory to store motion compensation data for an $(m+1)^{th}$ macroblock of the current image, which is output from the motion compensation engine;
    a third memory to store residue data indicating a difference between a macroblock of the current image and a macroblock of the reference image;
    an adder to perform reconstruction by adding residue data for the $m^{th}$ macroblock to the motion compensation data for the $m^{th}$ macroblock, where the residue data for the $m^{th}$ macroblock and the motion compensation data for the $m^{th}$ macroblock are respectively stored in the third memory and the first memory, or adding residue data for the $(m+1)^{th}$ macroblock to motion compensation data for the $(m+1)^{th}$ macroblock, where the residue data for the $(m+1)^{th}$ macroblock and motion compensation data for the $(m+1)^{th}$ macroblock are respectively stored in the third memory and the second memory, wherein the adder performs reconstruction for the $m^{th}$ macroblock simultaneously with the motion compensation engine performing prediction for the $(m+1)^{th}$ macroblock and register setting for an $(m+2)^{th}$ macroblock simultaneously.

10. The motion compensation apparatus of claim 9, further comprising:
- a slave interface to input and output the motion compensation parameters for the macroblocks of the current image and the macroblocks of the reference image, which correspond to the macroblocks of the current image; and
- a master slave to output the motion compensation parameters, input from the slave interface, to the motion compensation engine and to output reconstructed macroblocks input from the adder.

11. The motion compensation apparatus of claim 10, further comprising a queue buffer which temporarily stores the motion compensation parameters for the macroblocks of the current image and the macroblocks of the reference image, which correspond to the macroblocks of the current image.

12. The motion compensation apparatus of claim 9, wherein the first memory, the second memory, and the third memory are synchronous random access memories (SRAMs).

13. The motion compensation apparatus of claim 9, wherein the adder performs reconstruction for the $(m+1)^{th}$ macroblock and the motion compensation engine performs prediction for the $(m+2)^{th}$ macroblock and register setting for an $(m+3)^{th}$ macroblock, simultaneously.

* * * * *